(12) United States Patent
Ryan et al.

(10) Patent No.: US 11,443,440 B2
(45) Date of Patent: Sep. 13, 2022

(54) METHOD OF PROCESSING IMAGES OF A USERS EYE, ASSOCIATED SYSTEMS AND COMPUTER PROGRAMS

(71) Applicant: Tobii AB, Danderyd (SE)

(72) Inventors: Mark Ryan, Danderyd (SE); Oscar Lundqvist, Danderyd (SE); Oscar Nyman, Danderyd (SE)

(73) Assignee: Tobii AB, Danderyd (SE)

( * ) Notice: Subject to any disclaimer, the term of this patent is extended or adjusted under 35 U.S.C. 154(b) by 2 days.

(21) Appl. No.: 17/039,869

(22) Filed: Sep. 30, 2020

(65) Prior Publication Data
US 2021/0256715 A1 Aug. 19, 2021

(30) Foreign Application Priority Data
Sep. 30, 2019 (SE) .................... 1951104-7

(51) Int. Cl.
*G06T 7/254* (2017.01)
*G06F 3/01* (2006.01)
*G06K 9/62* (2022.01)
*G06V 10/75* (2022.01)
*G06V 40/18* (2022.01)

(52) U.S. Cl.
CPC .............. *G06T 7/254* (2017.01); *G06F 3/013* (2013.01); *G06K 9/6265* (2013.01); *G06V 10/751* (2022.01); *G06V 40/193* (2022.01); *G06T 2207/20224* (2013.01)

(58) Field of Classification Search
CPC .......... G06T 7/254; G06T 2207/20224; G06V 10/751; G06V 40/193; G06F 3/013; G06K 9/6265
See application file for complete search history.

(56) References Cited

U.S. PATENT DOCUMENTS

| | | | | |
|---|---|---|---|---|
| 5,592,247 A * | 1/1997 | Trokel | ..................... | A61B 3/06 351/239 |
| 6,437,808 B1 * | 8/2002 | Brill, III | ................. | G06T 13/40 715/765 |
| 6,496,594 B1 * | 12/2002 | Prokoski | ................ | A61B 5/415 382/125 |
| 6,926,429 B2 * | 8/2005 | Barlow | .................. | G08B 21/06 340/576 |
| 6,999,605 B2 * | 2/2006 | Kitagawa | .................. | G06T 7/20 340/5.83 |
| 7,158,097 B2 * | 1/2007 | Taylor | ..................... | G06F 3/013 345/156 |
| 8,317,325 B2 * | 11/2012 | Raguin | ................ | G06V 40/193 351/205 |
| 8,602,789 B2 * | 12/2013 | Hallowell | .............. | G16H 50/30 434/167 |

(Continued)

*Primary Examiner* — Manav Seth
(74) *Attorney, Agent, or Firm* — Kilpatrick Townsend & Stockton LLP (57) ABSTRACT

A computer-implemented method of selecting a sequence of images of a user's eye for an eye tracking application wherein each image is captured when a stationary stimulus point is displayed to the user, the method comprising: for a plurality of different pairs of the images: comparing the pair of images with each other to determine an image-score that represents a degree of difference between the compared images; and calculating a sequence-score based on the image-scores for the plurality of pairs of images.

20 Claims, 3 Drawing Sheets

(56) References Cited

U.S. PATENT DOCUMENTS

| | | | | |
|---|---|---|---|---|
| 8,787,654 B2* | 7/2014 | Zhang | ................... | H04N 17/00 |
| | | | | 348/42 |
| 8,824,779 B1* | 9/2014 | Smyth | ....................... | G06T 7/73 |
| | | | | 382/117 |
| 9,106,894 B1* | 8/2015 | Kvaalen | ................. | G06F 16/783 |
| 9,300,941 B2* | 3/2016 | Shand | ................... | H04N 13/139 |
| 9,514,364 B2* | 12/2016 | Sheng | .................... | G06F 3/013 |
| 9,569,846 B2* | 2/2017 | Fletcher | .............. | A61B 3/1225 |
| 9,795,290 B2* | 10/2017 | Grenon | ................... | A61B 3/14 |
| 11,270,134 B2* | 3/2022 | Gupta | .................... | G06T 7/579 |

\* cited by examiner

| Image sequences 620 | A | B | C | D | E | F | G | H | I | J | K |
|---|---|---|---|---|---|---|---|---|---|---|---|
| Accum-seq-scores 622 | 21 | 50 | 16 | 2 | 0 | 200 | 76 | 11 | 1 | 0 | 0 |
| Inspection-flags 624 | 1 | 1 | 0 | 0 | 0 | 1 | 1 | 0 | 0 | 0 | 0 |
| Discard-flags 626 | 0 | 1 | 0 | 0 | 0 | 1 | 1 | 0 | 0 | 0 | 0 |
| Peak-seq-scores 628 | 8 | 11 | 10 | 2 | 0 | 50 | 30 | 5 | 1 | 0 | 0 |
| Movement-flags 630 | 0 | 1 | 1 | 0 | 0 | 1 | 1 | 0 | 0 | 0 | 0 |
| Blink-flags 632 | 0 | 0 | 0 | 0 | 0 | 1 | 1 | 0 | 0 | 0 | 0 |

Fig. 7

METHOD OF PROCESSING IMAGES OF A USERS EYE, ASSOCIATED SYSTEMS AND COMPUTER PROGRAMS

CROSS-REFERENCES TO RELATED APPLICATIONS

This application claims priority to Swedish Application No. 1951104-7, filed Sep. 30, 2019; the content of which are hereby incorporated by reference.

TECHNICAL FIELD

The present disclosure generally relates to the field of eye tracking. In particular, the present disclosure relates to systems and methods for use in processing and/or selecting a sequence of images of a user's eye for use in an eye tracking system.

BACKGROUND

In eye tracking applications, digital images are retrieved of the eyes of a user and the digital images are analysed in order to estimate the gaze direction of the user. The estimation of the gaze direction may be based on computer-based image analysis of features of the imaged eye, such as pupil position or corneal reflections among others, that may be identified in the images. The image analysis may make use of calibration image data of the eye(s) of a user, or a plurality of users, which may be collated using machine-learning based models or neural networks. The calibration image data, which may be termed training data when used to train a machine-learning algorithm or neural network, may use a sequence of images of an eye wherein each image in the sequence is captured when the user's gaze is fixed on a stationary object or when a stationary stimulus point is displayed to the user to hold their gaze. The quality of the calibration image data may be important for accurate gaze direction estimation. In particular, the quality of the training data may be important in terms of the resultant performance of the machine-learning algorithm or neural network.

One known example method of eye tracking includes the use of infrared light and an image sensor. The infrared light is directed towards the pupil of a user and the reflection of the light is captured by an image sensor.

Portable or wearable eye tracking devices have also been previously described. One such eye tracking system is described in U.S. Pat. No. 9,041,787. A wearable eye tracking device is described using illuminators and image sensors for determining gaze direction.

SUMMARY

According to a first aspect of the present disclosure there is provided a computer-implemented method of processing or selecting a sequence of images of a user's eye for an eye tracking application (each image can be captured when a stationary stimulus point is displayed to the user), the method comprising:
for a plurality of different pairs of the images:
comparing the pair of images with each other to determine an image-score that represents a degree of difference between the compared images; and
calculating a sequence-score based on the image-scores for the plurality of pairs of images.
The method provides an image score and a sequence score that can be used to determine a compliance of the sequence of images with an instruction to a user to maintain their gaze on the stationary stimulus point. Determining a compliance of the sequence of images can confirm that the sequence of images is of sufficient quality for use in eye-tracking operations such as the calibration of an eye-tracking system or algorithm. This can result in an improved performance of eye tracking systems.

In one or more examples, each of the images in the sequence may comprise a gaze-location-identifier that represents the location of the stimulus on a screen that was presented to the user when the image was captured. The gaze-location-identifier may be the same for each image in the sequence of images.

Including a gaze-location-identifier in each image may enable the method to ensure that the processing or selecting is performed on a sequence of images captured for the same displayed stationary stimulus point. The gaze-location-identifier may enable the method to verify that the sequence of images corresponds to the same stimulus point or to select the sequence from a longer sequence corresponding to a series of multiple stationary stimulus points.

In one or more examples, the method may further comprise controlling how the sequence of images is passed to a downstream eye gaze tracking operation based on the sequence-score.

Controlling the passing of the sequence to a downstream eye gaze tracking operation based on the sequence score can enable the selective distribution of the sequence to downstream eye gaze tracking operations. In this way, the method can advantageously pass the sequence to one or more downstream operations by comparing the sequence score to a requirement of the downstream operation.

In one or more examples, the method may further comprise setting a discard-flag for at least a portion of the sequence of images if the sequence-score is greater than a discard-threshold.

Setting a discard flag can advantageously provide an indication to a downstream operation that the at least a portion of the sequence of images may not represent an image sequence of sufficient quality. The downstream operation may then selectively analyse, use and/or discard the data according to requirements of the downstream operation.

In one or more examples, the method may further comprise discarding the at least a portion of the sequence of images if the sequence-score is greater than the discard-threshold.

Discarding the at least a portion of the sequence of images can prevent the provision of a bad image sequence to a downstream operation.

In one or more examples, the method may further comprise:
setting an inspection-flag for at least a portion of the sequence of images if the sequence-score is greater than an inspection-threshold, wherein the inspection-threshold is less than a discard-threshold; and
if the inspection-flag is set, then providing the at least a portion of the sequence of images to a user for manually setting the discard-flag.

Setting an inspection flag according to an inspection-threshold less than the discard-threshold can advantageously provide a semi-autonomous process for sequences that have scores that are not a clear pass or a clear discard, but of potentially borderline quality.

In one or more examples, the method may further comprise performing a downstream eye gaze tracking operation on sequences of images for which the discard-flag is not set, and not performing the eye gaze tracking operation on sequences of images for which the discard-flag is set.

By selectively performing a downstream eye gaze tracking operation, such as a calibration algorithm, on sequences for which the discard-flag is not set the method may advantageously provide an improved downstream operation such as a calibration method.

In one or more examples, the method may further comprise:
performing a downstream eye gaze tracking operation on the sequence of images irrespective of whether or not the associated discard-flag is set; and
aggregating performance evaluation statistics on sequences of images for which the discard-flag is not set, and not aggregating performance evaluation statistics on sequences of images for which the discard-flag is set.

Performing a downstream operation on the whole sequence of images and selectively aggregating the output based on the discard-flag may provide an efficient downstream method that provides a high quality output.

In one or more examples, the method may further comprise:
identifying a sub-sequence of images as a plurality of consecutive images in the sequence of images that satisfy a sub-sequence-score-threshold; and
providing the sub-sequence of images to a downstream eye gaze tracking operation.

Providing a sub-sequence of images may advantageously trim sequences of isolated images with erroneously high image scores, such that the trimmed sequence has an acceptable sequence-score.

In one or more examples, the method may further comprise:
identifying a plurality of spaced apart sub-sequences of images in the sequence of images, wherein each sub-sequence comprises a plurality of consecutive images in the sequence of images that satisfy a sub-sequence-score-threshold; and
concatenating the plurality of sub-sequences of images to provide a concatenated-sequence of images; and
providing the concatenated-sequence of images to a downstream eye gaze tracking operation.

Identifying and concatenating a plurality of spaced apart sub-sequences that satisfy a sub-sequence-score-threshold may advantageously provide a method of filtering out erroneously high image-scores arising from an isolated event such as the user blinking.

In one or more examples, the eye gaze tracking operation may comprise:
a training algorithm for setting one or more trainable parameters of a machine learning model for performing eye gaze tracking on received images;
a calibration algorithm;
a verification algorithm; and/or
a performance evaluation algorithm.

In one or more examples, each sequence of images may comprise:
a gaze-location-identifier that represents the location of a stimulus on a screen that was presented to the user when the sequence of images was captured; and
the eye gaze tracking operation may perform its function based on the images and the gaze-location-identifier.

By performing its function based on the images and the gaze-location-identifier, the eye gaze tracking operation may advantageously perform its function based on a known stationary stimulus point that is presented to the user, and optionally enables the eye gaze tracking operation to distinguish between multiple stationary stimulus points.

In one or more examples, calculating the sequence-score based on the image-scores may comprise summing the image-scores to provide an accumulated-sequence-score.

In one or more examples, calculating the sequence-score based on the image-scores may comprise setting a peak-sequence-score as the maximum value of the image-scores.

In one or more examples, the method may further comprise:
setting a blink-flag for the sequence of images if the peak-sequence-score is greater than a blink-threshold; and
if the blink-flag is set, then passing the sequence of images to a downstream eye gaze tracking operation that requires the presence of a blink in the sequence of images; or
if the blink-flag is not set, then passing the sequence of images to a downstream eye gaze tracking operation that requires the absence of a blink in the sequence of images.

In one or more examples, the method may further comprise:
setting a movement-flag for the sequence of images if the peak-sequence-score is greater than a movement-threshold; and
if the movement-flag is set, then passing the sequence of images to a downstream eye gaze tracking operation that requires the presence of a movement in the sequence of images; or
if the movement-flag is not set, then passing the sequence of images to a downstream eye gaze tracking operation that requires the absence of movement in the sequence of images.

In one or more examples, comparing the pair of images may comprise comparing adjacent images in the sequence.

In one or more examples, the method may further comprise performing the comparing step for each of the second and subsequent images in the sequence.

In one or more examples, the method may further comprise performing the comparing step at least 90% of the images in the sequence.

In one or more examples, the method may further comprise:
causing a screen to display a stationary stimulus point to the user in accordance with a gaze-location-identifier; and
capturing the sequence of images of the user's eye while the screen is displaying the stationary stimulus point to the user.

In one or more examples each of the images may comprise a plurality of pixel positions, and each pixel position may have a pixel-value that represents the brightness or hue of the pixel. Comparing the pair of images may comprise:
comparing pixel-values at corresponding pixel-positions in the pair of images to determine pixel-value-differences; and
determining the image-score as a function of the pixel-value-differences.

In one or more examples, determining the image-score as a function of the pixel-value-differences may comprise summing absolute values of the pixel-value-differences.

In one or more examples, determining the image-score as a function of the pixel-value-differences may comprise:
comparing an absolute value of each pixel-value-difference to a pixel-value-threshold; and determining the image-score as either:
  the number of pixel-value-differences that are greater than or equal to the pixel-value-threshold; or
  the sum of the absolute pixel-value-differences that exceed the pixel-value-threshold.

In one or more examples, the sequence of images may represent a period of time that is at least 500 milliseconds.

In one or more examples each of the images may comprise: a plurality of pixel positions that represent a subset of pixels from a full-sensor-image, and a crop-identifier that represents the location of the subset of pixels in the full-sensor-image. Comparing the pair of images may comprise: determining a crop-offset-value as the difference between the crop-identifiers of the two images. The method may further comprise setting a discard-sequence-threshold based on the crop-offset-values; and setting a discard-flag for the sequence of images if the sequence-score is greater than the discard-sequence-threshold.

In one or more examples, each of the images may comprise:
  a plurality of pixel positions that represent a subset of pixels from a full-sensor-image, and
  a crop-identifier that represents the location of the subset of pixels in the full-sensor-image.
Comparing the pair of images in the sequence may comprise:
  determining crop-offset-value as the difference between the crop-identifiers of the two images;
  setting a pixel-value-threshold based on the crop-offset-value;
  comparing pixel-values at corresponding pixel-positions in the two images to determine pixel-value-differences; and
  determining the image-score as either:
    the number of pixel-value-differences that are greater than or equal to the pixel-value-threshold; or
    the sum of the absolute pixel-value-differences that exceed the pixel-value-threshold.

According to a further aspect of the present disclosure there is provided a processor configured to:
  receive a sequence of images of a user's eye for an eye tracking application;
  for a plurality of different pairs of the images:
    compare the pair of images with each other to determine an image-score that represents a degree of difference between the compared images; and
    calculate a sequence-score based on the image-scores for the plurality of pairs of images.

According to a further aspect of the present disclosure there is provided a computer program configured to perform any of the methods disclosed herein.

According to a further aspect of the present disclosure there is provided a computer-readable medium that stores any computer program disclosed herein.

There may be provided a computer program, which when run on a computer, causes the computer to configure any apparatus, including a processor or device disclosed herein, or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device.

BRIEF DESCRIPTION OF THE DRAWINGS

There now follows, by way of example only, a detailed description of embodiments of the invention with reference to the following figures, in which.

All the figures are schematic and generally only show parts which are necessary in order to elucidate the respective embodiments, whereas other parts may be omitted or merely suggested.

DETAILED DESCRIPTION

Figure 1:
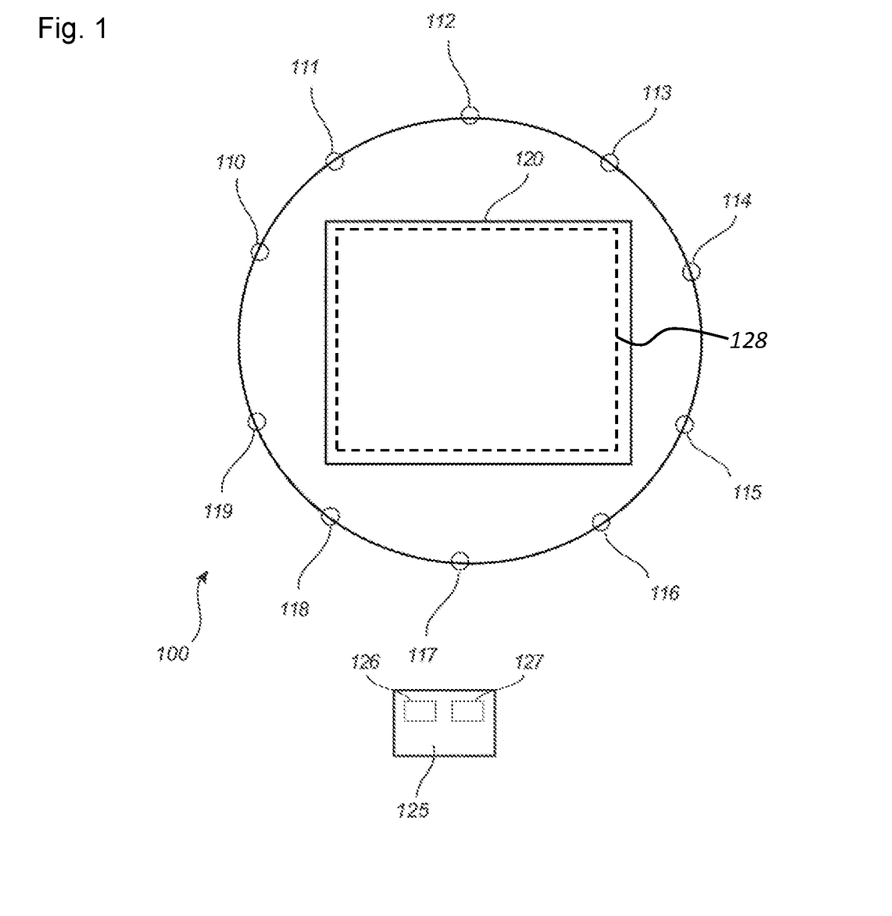
FIG. 1 shows a schematic view of an eye tacking system which may be used to capture a sequence of images which may be used by example embodiments.

FIG. 1 shows a simplified view of an eye tracking system 100 (which may also be referred to as a gaze tracking system) in a head mounted device in the form of a virtual or augmented reality (VR or AR) device or VR or AR glasses. The system 100 comprises an image sensor 120 (e.g. a camera) for capturing images of the eyes of the user. The system may optionally include one or more illuminators 110-119 for illuminating the eyes of a user, which may for example be light emitting diodes emitting light in the infrared frequency band, or in the near infrared frequency band and which may be physically arranged in a variety of configurations. The image sensor 120 may for example be an image sensor of any type, such as a complementary metal oxide semiconductor (CMOS) image sensor or a charged coupled device (CCD) image sensor. The image sensor may consist of an integrated circuit containing an array of pixel sensors, each pixel containing a photodetector and an active amplifier. The image sensor may be capable of converting light into digital signals. In one or more examples, it could be an Infrared image sensor or IR image sensor, an RGB sensor, an RGBW sensor or an RGB or RGBW sensor with IR filter.

The eye tracking system 100 may comprise circuitry 125, for example including a receiver 126 and processing circuitry 127, for receiving and processing the images captured by the image sensor 120. The circuitry 125 may for example be connected to the image sensor 120 and the optional one or more illuminators 110-119 via a wired or a wireless connection and be co-located with the image sensor 120 and the one or more illuminators 110-119 or located at a distance, e.g. in a different device. In another example, the circuitry 125 may be provided in one or more stacked layers below the light sensitive surface of the light sensor 120.

The eye tracking system 100 may include a display 128 for presenting information and/or visual stimuli to the user.

The display may comprise a VR display which presents imagery and substantially blocks the user's view of the real-world or an AR display which presents imagery that is to be perceived as overlaid over the user's view of the real-world.

It is to be noted that the location of the image sensor 120 and the display 128 in FIG. 1 is only for illustrative purposes. The location of the image sensor 120 for one eye in such a system 100 is generally away from the line of sight for the user in order not to obscure the display 128 for that eye. This configuration may be, for example, enabled by means of so-called hot mirrors which reflects a portion of the light and allows the rest of the light to pass, e.g. infrared light is reflected, and visible light is allowed to pass.

While in the above example the images of the user's eye are captured by a head-mounted image sensor 120, due to it forming part of the eye tracking system 100, the images may alternatively be captured by an image sensor separate from an eye tracking system 100 wherein said image sensor 120 may be head-mounted or not head-mounted. The head mounting of an image sensor directed towards the eye, as will be appreciated, isolates any head movement from any movement of the eye in the captured image. However, if the image sensor is not head mounted, movement of the eye in the captured images may be due to movement of the user's eye or due to movement of the user's head. Thus, for examples in which the image sensor is not head-mounted, then the system may be configured to receive information that is indicative of the movement of the user's head relative to the image sensor so that eye position and/or movement can be determined from the images captured by the image sensor. Alternatively, image processing may be performed on a full sensor image to recognise a region of the image that contains the user's eye. Gaze tracking can then be performed on the recognised region of the image. As will be discussed below, this can involve an algorithm determining a crop-identifier that represents the location of the region (which represents a subset of pixels) in the full-sensor-image that includes the user's eye.

Figure 2:
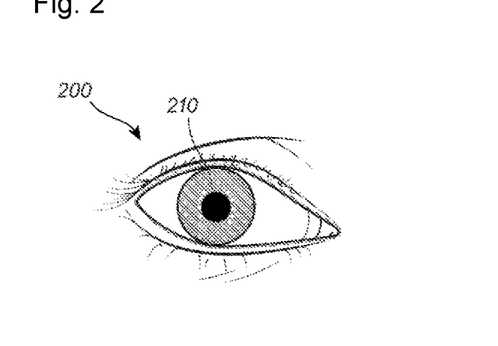
FIG. 2 shows an example image of an eye.

FIG. 2 shows a simplified example of an image of an eye 200, captured by the image sensor 120 of FIG. 1. The circuitry 125 may for example employ image processing (such as digital image processing) for extracting features in the image. The circuitry 125 may for example identify the location of the pupil 210 in the one or more images captured by the image sensor 120.

Figure 3:
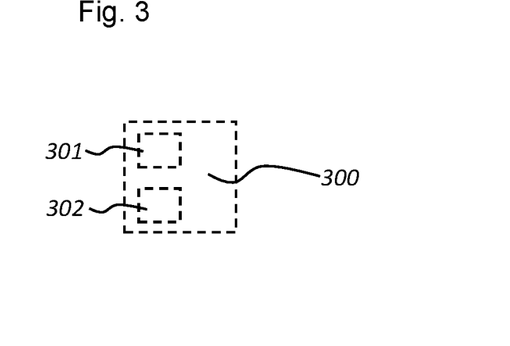
FIG. 3 shows an example apparatus for processing and/or selecting a sequence of images of a user's eye.

In one or more examples, an apparatus 300 shown in FIG. 3 may provide for processing or selecting of sequences of images. The sequence of images may be for use as calibration data, such as calibration data applicable to an individual user or calibration data for use as training data for a machine-leaning algorithm or neural network. In one or more examples, the apparatus 300 may form part of the circuitry 125. In one or more examples, the circuitry 125 may be configured to transmit the captured images for processing by the apparatus 300, which may comprise a computer or server, remote from the eye tracking system 100. Thus, in general, the apparatus 300 may be considered to comprise a processor 301 having access to memory 302 that receives the images from the image sensor 120 and computer program code that defines the steps performed by the processor 301.

Eye tracking systems 100 may make use of calibration image data and/or machine-learning algorithms or neural networks that are trained based on calibration image data to perform eye tracking. As mentioned above, the calibration image data, which may be termed training data when used to train a machine-learning algorithm or neural network, may use a sequence of images of an eye wherein each image in the sequence is captured when the user's gaze is fixed on a stationary object or when a stationary stimulus point is displayed to the user to hold their gaze. The stationary stimulus point may or not be displayed on an electronic display. For instance, it could be displayed on a whiteboard. Alternatively, a user could be instructed to direct their gaze at a fixed point on a wall, or a stationary piece of furniture in a room. What can be important is that the stimulus point and the camera are constant relative to each other, in terms of distance and/or rotational position.

The quality of the calibration image data may be important for accurate gaze direction estimation. In particular, the quality of the training data may be important in terms of the resultant performance of the machine-learning algorithm or neural network.

Figure 4:
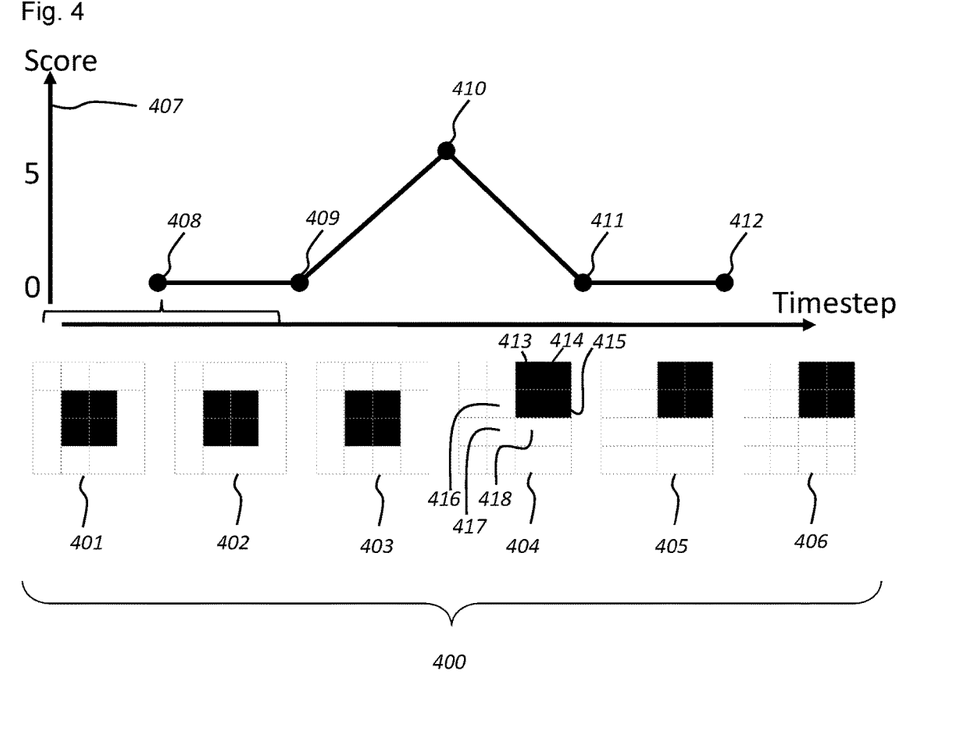
FIG. 4 shows an example sequence of images and an example determination of the image-scores and a series-score.

With reference to FIG. 4 and in accordance with a first embodiment, we disclose a method of processing a sequence of images 400 of a user's eye for use in an eye tracking application and an apparatus 300 configured to perform said method. In one or more examples, said processing may comprise the making of a selection of the sequence of images or a part thereof, such as a positive or negative selection, for subsequent use as calibration data, performance monitoring data or for other eye tracking purposes. Thus, in one or more examples, the method may provide for the effective screening of one or more sequences of images. In one or more examples, the method may provide for the effective editing of sequences of images based on the positive or negative selection of parts of the sequence of images 400. For instance a positive selection may involve selecting a sequence of images or a part thereof for subsequent downstream processing, and a negative selection may involve selecting a sequence of images or a part thereof for exclusion from subsequent downstream processing. Therefore, a negative selection can also be considered as discarding a sequence of images from a downstream processing operation.

FIG. 4 shows the sequence of images 400 which may be received from the image sensor 120 and which may have been transmitted to the memory 302 of the apparatus 300 performing said method. The sequence of images 400 comprise a time consecutive plurality of individual images comprising a first through sixth image 401-406 in the example of FIG. 4. It will be appreciated that the sequence of images may comprise any number of images greater than three images. The sequence of images 400 may comprise, for example, at least 20 images or at least 30 images or many more. The temporal period represented by the sequence of images may comprise at least 0.5 seconds or at least 1 second. The rate at which the sequence of images 400 is captured may comprise at least 15 Hz or at least 30 Hz, and may typically comprise 30 to 200 Hz. The resolution of the images 401-406 of the sequence of images 400 may comprise at least 2 pixels per mm of imaged eye. Accordingly, the resolution of a typical image may comprise at least 50×50 pixels. In other examples, the resolution may comprise 40 pixels per mm of imaged eye and, accordingly, the resolution of a typical image may comprise at least 1000× 1000 pixels. It will be appreciated that the sequence of images 400 processed by the method may be images at a native resolution and/or native frame rate of the image sensor 120 or may be down-sampled or up-sampled in terms of resolution and/or frame rate from the native resolution or native frame rate of the image sensor 120.

The method or apparatus 300 performing the method may be configured to control the capture of the sequence or images or, alternatively, it may be fed with sequences of images captured by the image sensor 120 of one or more systems 100.

The sequence of images 400 should be captured when the user's gaze is maintained in a stationary direction. In one or more examples, the sequence of images 400 comprise images captured while the user is instructed to maintain their gaze in a stationary direction, such as by a visible or audible instruction. In one or more examples, the user may be instructed to maintain their gaze on a point or object identified in their field of view. In other examples, the sequence of images 400 comprise images captured while a stationary stimulus point is displayed to the user, such as by the AR or VR display 128, and wherein the user is expected to maintain their gaze on the stationary stimulus point. The sequence of images 400 may be captured while a plurality of individual stationary stimulus points are displayed to the user in turn. As discussed further below, a gaze-location-identifier can be included with each image to represent the location of the stimulus presented to the user when the image was captured.

The relative position of the stationary stimulus point to the image sensor should be substantially constant when the sequence of images is captured. In a head-mounted arrangement, the relative positions between the stationary stimulus point, the image sensor and the eye of the user should all remain substantially constant.

It will be appreciated that the control of the capture of the sequence of images and the provision of the instruction to maintain a stationary eye gaze may or may not be part of an embodiment of the method and functionality of the apparatus 300. It will be appreciated that the method or apparatus 300 may be provided with one or more sequences of images 400 that have been captured using any of the example methodologies above or others that encourage the user to maintain a stationary eye position.

The method comprises, for a plurality of different pairs of the images 401-406, comparing the pair of images with each other to determine an image-score 407 that represents a degree of difference between the compared images; and calculating a sequence-score based on the image-scores 407 for the plurality of pairs of images.

By calculating image scores 407 and a sequence-score, one or more of the disclosed methods can enable compliance checking of the sequence of images 400 with the instruction to maintain a gaze on a stationary stimulus point.

In one or more examples, the pairs of images comprise adjacent images in the sequence, that is images that are captured time consecutively one directly after the other in the sequence 400. For example, a first pair of images may comprise the first image 401 and the second image 402. The second pair may comprise the second image 402 and the third image 403 and so on. Accordingly, the pairs of images may consist of overlapping selections of pairs of images that form the sequence of images 400. Using overlapping selections of pairs of images can ensure that any sudden step-changes in pixel differences are identified. For example, the image differences associated with the beginning and/or end of a blink action may not be captured by non-overlapping consecutive image pairs.

In other examples, a first pair may comprise the first image 401 and the second image 402. The second pair may comprise the third image 403 and the fourth image 404 and so on. Accordingly, the pairs of images may consist of non-overlapping selections of pairs of images that form the sequence of images 400. In other examples, a combination of overlapping and non-overlapping selections may be used in determining the pairs of images. It can be advantageous to compare consecutive images because this can enable the time at which a specific event (such as a blink or eye movement) to be readily identifiable.

In one or more examples, one or more reference images may be determined based on predetermined criteria. A reference image may be one of the first to sixth images 401-406. the pairs of images may comprise the reference image with other ones of the other images in the sequence 400 in turn. Accordingly, the first image 401 may be designated the reference image and therefore the first pair may comprise the first image 401 and the second image 402; the second pair may comprise the first image 401 and the third image 403; and the third pair may comprise the first image 401 and the fourth image 404; and so on.

FIG. 4 shows a graph illustrating the image-score assigned to each pair of compared images. Accordingly, point 408 represents the image-score determined from the comparison of the first image 401 and the second image 402. The image-score in this example comprises zero because no difference is identified between the pair of images. Point 409 represents the image-score, shown as zero, determined from the comparison of the second image 402 and the third image 403. Point 410 represents the image-score determined from the comparison of the third image 403 and the fourth image 404 and comprises a score of six. In this example, the score of six represents the number of pixel positions in one of the images of the image pair for which there is a difference relative to the equivalent pixel positions in the other of the images of the pair. Thus, six pixel positions 413, 414, 415, 416, 417 and 418 in the fourth image 404 relative to the third image 403 have a change in brightness. Point 411 represents the image-score, shown as zero, determined from the comparison of the fourth image 404 and the fifth image 405. Point 412 represents the image-score, shown as zero, determined from the comparison of the fifth image 405 and the sixth image 406.

Whether or not there is a difference in the value of a pixel at corresponding pixel positions between the pairs of images may be based on there being a difference in pixel brightness. In other examples, a difference in pixel hue may be used. Pixel-value-differences can be determined by comparing the brightness or hue pixel-values at corresponding pixel positions. The image score is determined as a function of the pixel-value-differences.

In some examples, an absolute difference between pixel-values may be calculated such that it is does not matter which of the pixel-values is greater than the other; the absolute value of the difference will be used. This can be especially useful if the image-scores are subsequently summed so that positive and negative pixel-values do not cancel each other out.

In one or more examples, the image score is determined as the sum of the absolute values of the pixel-value-differences. For example, the brightness or hue may be represented by an 8-bit digital value from 0 to 255. Absolute values of the pixel-value-differences may also be represented as an 8-bit digital value. Determining the image score may comprise summing the 8-bit pixel-value-differences for each pair of pixel-values at corresponding pixel positions.

In one or more examples, the image score may be determined by comparing the absolute pixel-value-differences to a pixel-value-threshold. The image score may comprise either: the integer number of absolute pixel-value-differences that are greater than or equal to the pixel-valuethreshold; or the sum of the absolute pixel-value-differences that exceed the pixel-value-threshold.

To summarise, in this example, each of the images comprise a plurality of pixel positions, and each pixel position has a pixel-value that represents the brightness or hue of the pixel. The method may include comparing the pair(s) of images by comparing pixel-values at corresponding pixel-positions in the pair of images to determine pixel-value-differences; and determining the image-score as a function of the pixel-value-differences.

Thus, in one or more examples, the image-score is representative of a degree of difference between the compared images in terms of a number of sub-region positions, such as pixel positions, at which there is a difference between the images of the image pair above a threshold amount. Thus, while the pixels may be considered to divide the image into a grid of pixel positions, in one or more examples the sub-regions could be larger than one pixel position. Further, the sub-regions may be different sizes at different positions in the image, which may improve processing efficiency.

While differences between corresponding pixel or sub-region positions is used to determine the image-score in this example, other examples may use different score assigning schemes.

It will be appreciated that a low score (such as zero) represents little or no difference and a higher positive number represents a greater degree of difference. In other examples, a high score may represent a low degree of difference and a low score may represent a high degree of difference.

The sequence-score is based on the image-scores for the plurality of pairs of images. In one or more examples, the sequence-score may comprise a function of the image-scores, such as a sum or multiple of the image-scores. In one or more examples, the calculating of the sequence-score may be performed concurrently with determination of the image-scores as the method steps through the plurality of pairs. Thus, calculating the sequence-score based on the image-scores may comprise summing the image-scores to provide an accumulated-sequence-score. The accumulated-sequence-score may comprise the sequence-score once all of the intended image-scores have been summed. Alternatively, the sequence-score may be calculated once all of the image-scores have been determined.

In the example of FIG. 4, the sequence-score comprises the sum of image-scores and therefore comprises 0+0+6+0+0=6. The sequence-score may be used, such as by comparison to a threshold, to determine how the sequence of images 400 is used further.

An example computer routine is provided below for determining the image-scores and sequence-score, wherein:

"previous_image" comprises a working image designation to step through the images of the sequence 400, "recording.images" comprises the data structure representing the sequence of images 400, Stimulus_point_is_stationary(image) represents the checking of a gaze-location-identifier, which will be described below, and "score" and "scores" represent the image-score and accumulated-sequence-score respectively.

```
previous_image = None
scores = [ ]
for image in recording.images{
    if stimulus_point_is_stationary(image) and previous_image is not
    None{
        score = total_abs_diff(previous_image, image)
        scores.append([image.frame_nr, score])
    }
    previous_image = image
}
```

Further, "total_abs_diff" calculates the sum of the absolute difference between a pixel in the first input image and the corresponding pixel in the second input image for all pixels in the images, which are assumed to be the same size.

The sequence-score has been found to provide an efficient way of determining whether or not a sequence of images 400 is suitable for downstream use in the field of eye tracking. Thus, even when the user attempts to keep their eye position stationary, it may not always be successful, and while a single or a few temporally short deviations in a much larger sequence of images may not be problematic, many deviations or deviations representing a large degree of difference can result in the sequence of images 400 being sub-optimal for downstream operations. The disclosed method of determining the sequence-score represents a technically efficient way of processing sequences of images of a user's eye.

The plurality of pairs of images may be selected to include all of the images in the sequence 400 in at least one pair of the plurality of pairs. In other examples, less than all of the images 401-406 (e.g. at least 80%, 90% or 95%) may be included in one of the plurality of pairs. For example, if a threshold value for the sequence-score (e.g. the accumulated sequence-score) is reached before all of the image-scores have been considered, then the method may end prior to accumulating all of the intended image-scores into the sequence-score.

As mentioned above, it may be assumed in performing the method that the eye position or related gaze direction is stationary (or at least the user attempted to maintain a stationary position) for the sequence of images. In one or more examples, each of the images in the sequence of images 400 comprises a gaze-location-identifier that represents the location of a stimulus on the display 128 that was presented to the user when the image was captured. The gaze-location-identifier may be embodied as metadata or other indicator linked to each image in the sequence 400. Thus, the method may be performed on sequences of images 400 for which the gaze-location-identifier is the same for each image 401-406 in the sequence of images 400. In one or more examples, the method may include the step of verifying that the gaze-location-identifier is indicative of the same location of the stimulus for each of the images 401-406 before proceeding with the comparing step to determine the image-scores. In other examples, the method may include selecting a sub-set of consecutive images from a stream of images to form the sequence of images 400 based on the gaze-location-identifier being the same for the images of the sub-set. The method may be configured to select a sub-set with a predetermined minimum number of constituent images. The method may be further configured to select a sub-set that does not include images that are proximal to a transition in the gaze-location-identifier. For example, the method may select a sub-set of images that are at least a predetermined number of images from the transition in the gaze-location identifier. This may allow for a reaction time of the user in responding to a new stimulus point and/or gaze instruction.

The method may include controlling how the sequence of images 400 is passed to a downstream eye gaze tracking operation based on the sequence-score. The control may comprise whether or not the sequence of images is passed to a downstream eye gaze tracking operation (or otherwise, discarded, for example). The control may comprise the determination of a part of the sequence of images that is passed to the downstream eye gaze tracking operation. For instance, the control may be whether to retain the sequence of images for a downstream operation that assesses the eye tracking performance, or whether to discard the sequence of images for the assessment of eye tracking performance. In some applications, the subsequent eye gaze tracking operation is performed on image sequences irrespective of whether or not the discard-flag is set, but the method only aggregates performance evaluation statistics for frames where the discard-flag is not set. In this way, the method can aggregate performance evaluation statistics on sequences of images for which the discard-flag is not set, and not aggregate performance evaluation statistics on sequences of images for which the discard-flag is set. This can also be considered as not performing the eye gaze tracking operation on sequences of images for which the discard-flag, when the aggregation of performance evaluation statistics is itself considered as a downstream eye gaze tracking operation. That is, when the eye gaze tracking performance is evaluated, results from frames (images) that had discard flags set are ignored. The control may be based on a comparison of the sequence-score with one or more thresholds such that the sequence-score being one side of the threshold results in a first control being performed and the other side of the threshold results in a second, different control being performed.

The eye gaze tracking operation may comprise a training algorithm for setting one or more trainable parameters of a machine learning model for performing eye gaze tracking on received images; a calibration algorithm; a verification algorithm; and/or a performance evaluation algorithm. Various examples of the type of performance that can be evaluated by a performance evaluation algorithm can include:

the accuracy of the gaze estimates (difference between the measured gaze and the actual gaze, which is assumed to be towards the stimuli point), the precision of the gaze estimates, i.e. the variation between gaze estimates made from different images (where the user is looking at a fixed point) and/or the output rate, i.e. for what percentage of images is the eye gaze tracking operation able to make any gaze estimate at all. This value will often not be 100% if images where the user is blinking are included in the evaluation. Embodiments disclosed herein can remove any such sub-optimal images from the evaluation, which can enable a higher output rate to be achieved.

It will be appreciated that if the user is not looking at the fixed point, then the accuracy estimate will be erroneous and not reflective of the true performance of the performance evaluation algorithm. One or more of the examples disclosed herein can help address this problem by selecting only frames where the user is looking at a fixed point for use in the performance evaluation.

In one or more examples, for a sequence-score in which a higher score represents a greater degree of difference between pairs of images accumulated from the image-scores, if the sequence score is greater than a threshold, termed a discard-threshold, then the sequence of images may be labelled for discarding and may therefore not be passed to the downstream eye gaze tracking operation. If the sequence-score is less than or equal to the discard-threshold, then the sequence of images may be passed to the downstream eye gaze tracking operation. Accordingly, in one or more examples, the sequence of images 400 or a part thereof may be supplemented with a discard-flag (such as metadata) to identify the sequence of images 400 or parts thereof that do not have an acceptable sequence-score relative to the discard-threshold.

In one or more examples, it may not be necessary to pass all of the images of the sequence of images 400 to the downstream eye gaze tracking operation. For example, the downstream eye gaze tracking operation may be able to operate with fewer images than that present in the sequence 400. In such examples, the method may comprise dividing the sequence of images into a plurality of sub-sequences, each sub-sequence comprising a plurality of (e.g. at least three) consecutive images, and determining a plurality of sequence-scores (termed sub-sequence-scores to distinguish them from the sequence-score but which are calculated in the same manner) based on the image-scores for pairs of images in each of said sub-sequences. The plurality of sub-sequence-scores may be compared to a sub-sequence-score-threshold to determine whether or not each of the sub-sequences of images is passed to the downstream eye gaze tracking operation. The sub-sequences that have an unacceptable sub-sequence-score may be discarded. Accordingly, the method may effectively trim sequences of images such that the trimmed sequence has an acceptable sequence-score.

In one or more examples, the downstream eye gaze tracking operation comprises a process that evaluates the performance of eye gaze tracking to determine a performance-statistic and wherein the calculation of the performance-statistic is based on sequences of images 400 for which the discard-flag is not set and not based on sequences of images 400 for which the discard-flag is set.

In one or more examples, the sequence-score may be used to identify sequences of images 400 or parts thereof that should be forwarded for manual inspection by a user (not necessarily the user who has had their eye imaged in the plurality of images). Accordingly, in one or more examples, the method may include setting an inspection-flag for the sequence of images 400 or at least a portion of the sequence of images 400 if the sequence-score is greater than an inspection-threshold. The inspection-flag may be recorded as metadata associated with the sequence as a whole or each of the images 401-406 thereof. If the inspection-threshold is used in conjunction with the discard-threshold then the inspection-threshold is typically less than the discard-threshold. The method may include the step of, if the inspection-flag is set (and optionally if the discard-flag, if there is one, is not set), providing the at least a portion of the sequence of images to a user for manually setting the discard-flag. In one or more examples, this step may comprise providing for display of at least one or more of the images for which the inspection-flag is set and receiving user-input regarding whether or not to set the discard-flag.

For either or both of the discard-flag or inspection-flag, the method may comprise determining if the sequence-score is above the associated threshold. If it is, then the method may be configured to identify which image-scores are above a further threshold and set the relevant flag only for the images that have such an image-score. Thus, the method may advantageously use the sequence-score to assess the overall sequence of images 400 and then set the flag(s) for specific images in the sequence for discarding or manual inspection. This may provide an efficient method.

Despite a user attempting to maintain a stationary eye position i.e. gaze direction, one or more of the images 401-406 may include a blink. Given the typically transient nature of a blink, it may be possible that the plurality of images in the sequence of images 400 prior to and after the blink may be satisfactory even if the whole sequence is not, by virtue of its sequence-score exceeding the discard-threshold. Accordingly, the method may be configured to automatically edit the sequence of images 400 such that the edited sequence has an acceptable sequence-score.

Figure 5:
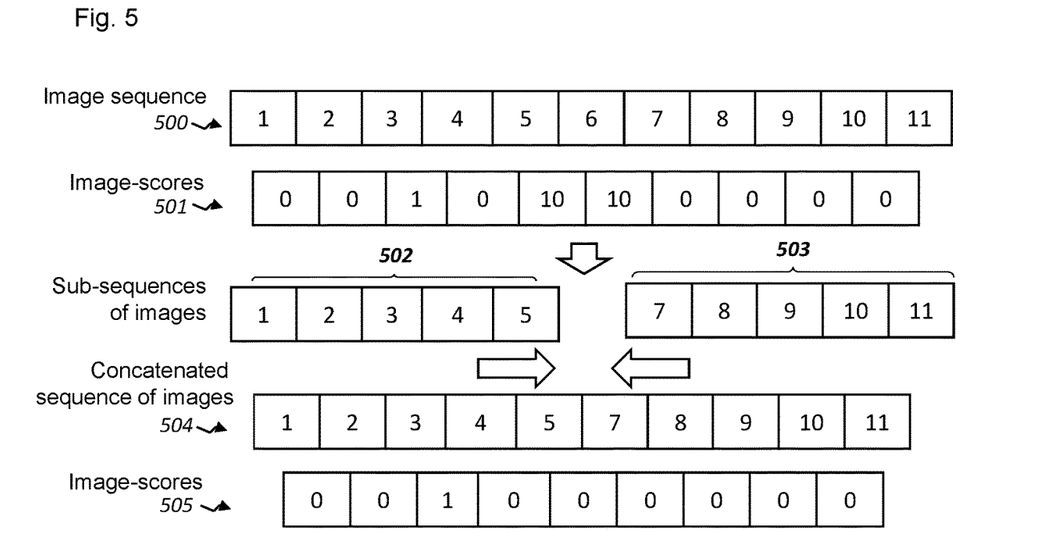
FIG. 5 shows, diagrammatically, a sequence of eleven images and their associated image-scores and the concatenation of the sequence of images.

FIG. 5 shows a sequence of images 500, designated by an image number of one to eleven for simplicity. The table 501 shows a series of image-scores for the pairs of images above each box in the table. Accordingly, the image score for the pair of images one and two is zero. The image-score for the pair of images 3 and 4 is one. The image-score for the pair of images 5 and 6 is ten and the image-score for the pair of images 6 and 7 is also ten. The image six may have the large difference compared to images five and seven due to the presence of a blink. The identification of the blink may be based on which image-scores exceed a blink threshold and which do not.

Thus, the method may be configured to identify a plurality of spaced apart sub-sequences 502, 503 of images in the sequence of images, which may be temporally before and after a blink, wherein each sub-sequence comprises a plurality of consecutive images in the sequence of images 400 that satisfy a sub-sequence-score-threshold. In this example the sub-sequence-score is determined in the same way as the sequence-score. Accordingly, the image-scores for the images one to five in the first sub-sequence 502 comprise zero, zero, one, zero. A summation (or other function in other examples) results in a sub-sequence-score of one. In this example, the image-scores for the images seven to eleven in the second sub-sequence 503 comprise zero, zero, zero, zero. A summation (or other function in other examples) results in a sub-sequence-score of zero.

In one or more examples, the identification of where in the sequence of images 500 the sub-sequences are spaced apart may be based on determination of one or more image-scores for consecutive images that exceed a blink-threshold. In this example, the blink threshold may be nine and therefore the image-scores of ten for image pair five and six and image pair six and seven, may indicate that the blink occurs in the image(s) common to those image pairs i.e. image six.

In addition, or alternatively, the method may include identifying said sub-sequences 502, 503 by testing candidate sub-sequences of the sequence of images to determine if the sub-sequence-score-threshold is met. Accordingly, the method may begin with a candidate sub-sequence of a predetermined number of images 500 and progressively shortening the candidate sub-sequences in terms of the number of images therein and/or may designate different consecutive groups of the sequence of images 500 as the candidate sub-sequence. The method may determine whether each candidate sub-sequence meets the sub-sequence-score-threshold. The candidate subsequence which has the greatest number of images may be determined to be at least one of sub-sequences. The test may comprise calculating a sub-sequence-score for each of said candidate sub-sequence.

Thus, the consecutive images of the sequence of images 500 in which a blink occurs can be excluded from the spaced apart sub-sequences of images.

The method may then comprise concatenating the plurality of sub-sequences 502, 503 of images to provide a concatenated-sequence of images 504; and providing the concatenated-sequence 504 of images to a downstream eye gaze tracking operation. The concatenated-sequence of images may be considered to comprise the sequence of images with the blink "edited out". Thus, the concatenated-sequence of images 504 is based on the sequence 500 but with image six removed. Table 505 shows the plurality of image-scores for the concatenated-sequence of images 504. The sequence-score, in this example, for said concatenated-sequence of images 504 is therefore 0+0+1+0+0+0+0+0+0=1.

In one or more examples, a sequence of images that includes a blink may be required for a particular downstream eye tracking operation.

The method may include determining the highest or maximum value of the plurality of image-scores determined from the sequence of images 500 and designating that maximum value as a "peak-sequence-score". In the example of FIG. 5, the peak-sequence-score is ten.

The method may then set a blink-flag for the sequence of images 500, which is indicative of the sequence containing a blink, if the peak-sequence-score is greater than a blink-threshold.

Thus, if the blink-flag is set, then the method may include passing the sequence of images to a downstream eye gaze tracking operation that requires the presence of a blink in the sequence of images; or if the blink-flag is not set, then passing the sequence of images to a downstream eye gaze tracking operation that requires the absence of a blink in the sequence of images.

In one or more examples, a sequence of images that includes an eye movement, such as involuntary eye movement, may be required for a particular downstream eye tracking operation.

The method may include determining the highest or maximum value of the plurality of image-scores determined from the sequence of images 400 and designating that maximum value as a "peak-sequence-score".

The method may then set a movement-flag for the sequence of images 400, which is indicative of the sequence containing a movement, if the peak-sequence-score is greater than a movement-threshold. The movement-threshold may be less than the blink-threshold.

Thus, if the movement-flag is set, then the method may include passing the sequence of images to a downstream eye gaze tracking operation that requires the presence of movement in the sequence of images; or if the movement-flag is not set, then passing the sequence of images to a downstream eye gaze tracking operation that requires the absence of a movement in the sequence of images.

Thus, the method may effectively categorise the sequences of images as any two of those that include images having a stationary eye position, those that include images that include a blink and those that include images that includes movement.

Figure 6:
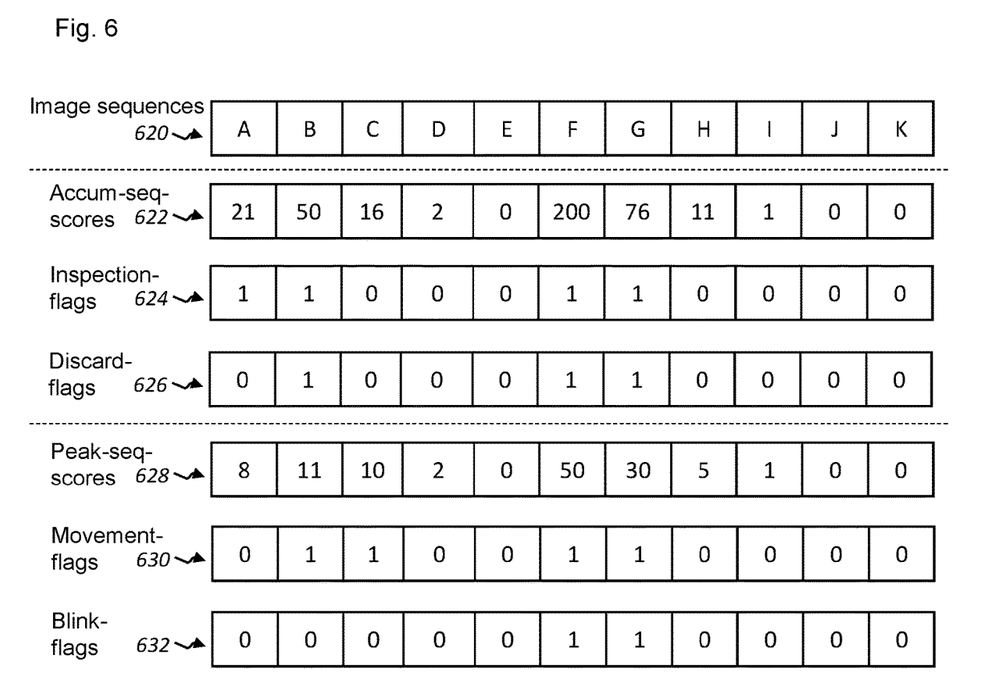
FIG. 6 shows, diagrammatically, how sequence-scores associated with a plurality of sequences of images can be compared with various flags.

FIG. 6 shows, diagrammatically, an example of how sequence-scores can be compared with thresholds to set various flags.

FIG. 6 shows a plurality of sequences of images 620. Each sequence is labelled with a letter A-K. FIG. 6 also shows the accumulated-sequence-scores 622 and the peak-sequence-scores 628 associated with each sequence of images 620. These scores 622, 628 can be calculated in the same way as described above.

In this example, the accumulated-sequence-scores 622 are compared with a discard-threshold and an inspection-threshold in order to determine whether or not to set corresponding discard-flags 626 and inspection-flags 624 associated with each of the image sequences. In FIG. 6 the discard-threshold has a value of 50, and the inspection-threshold has a value of 20. Therefore the discard-flag 626 is set for image sequences B, F and G, and the inspection-flag 624 is set for image sequences A, B, F and G.

Also in this example, the peak-sequence-scores 628 are compared with a movement-threshold and a blink-threshold in order to determine whether or not to set corresponding movement-flags 630 and blink-flags 632 associated with each of the image sequences. In FIG. 6 the movement-threshold has a value of 10, and the blink-threshold has a value of 20. Therefore the movement-flag 630 is set for image sequences B, C, F and G, and the blink-flag 624 is set for image sequences F and G, It will be appreciated that FIG. 6. is merely one example of how the flags can be set, and that either or both of the accumulated—sequence-score 622 and the peak-sequence-score 628 can be compared with appropriate thresholds in order set any of the flags. It will be also be appreciated that the numerical values used for the accumulated-sequence-scores 622 and the peak-sequence-scores 628, as well as the thresholds, are purely arbitrary in order to illustrate the principles of how flags can be set based on sequence-scores.

A method or processor can use any of the flags 624, 626, 630, 632 shown in FIG. 6 in any of the ways described herein.

Figure 7:
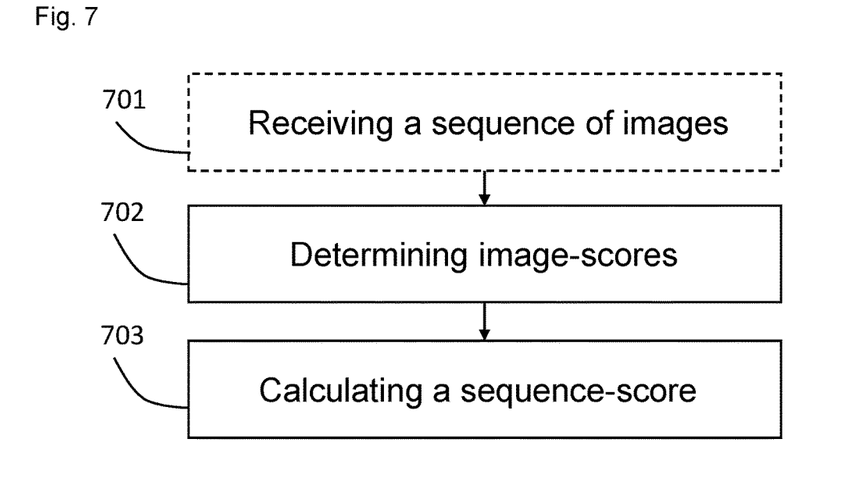
FIG. 7 is a flow chart of an example of a method.

FIG. 7 shows a flowchart that summarises an embodiment of the method. The flowchart shows, optionally, receiving 701 a sequence of images of a user's eye for an eye tracking application wherein each image is captured when the user's eye is intended to be stationary; and, for a plurality of different pairs of the images:

comparing 702 the pair of images with each other to determine an image-score that represents a degree of difference between the compared images; and calculating 703 a sequence-score based on the image-scores for the plurality of pairs of images.

As described above, in one or more examples the sequence of images may be captured by an image sensor that is not head-mounted. Non-head-mounted image sensors may comprise a wider field of view than head-mounted image sensors. As a result, the captured images may comprise images encompassing substantially more than a user's eye or eyes, such as a full head or an upper torso of a user.

In such examples, movement of a user's eye will be superimposed upon any movement of a user's head. Therefore, in one or more examples, the disclosed methods may further comprise determining a movement of the user's head before determining a relative movement of the user's eye. In addition, movement of a user's head may result in different ambient lighting conditions in the region of the user's eye. As a result, the discard-sequence-threshold may be reduced accordingly.

Each of the images may comprise a plurality of pixel-positions that represent a subset of pixels from a full-sensor-image. For example, the subset of pixels may correspond to a user's eye. Determining the subset of pixels may be accomplished using an object recognition algorithm to isolate the portion of the image that includes the user's eye. The image may further comprise a crop-identifier that represents the location of the subset of pixels in the full-sensor-image. One or more example methods may comprise determining the subset of pixels and the crop-identifier. Alternatively, the subset of pixels and the crop-identifier may be determined as part of a separate process and may be received with the sequence of captured images.

In some examples, with sequences of images comprising a subset of pixels and a crop identifier, comparison of the pairs of images may be performed on only the corresponding subsets of pixels. Comparing pairs of images may comprise determining a crop-offset-value as the difference between the crop-identifiers of the two images. The crop-offset-value can provide an indication of head movement. The method can also comprises setting a discard-sequence-threshold based on the crop-offset-values. In some applications, the discard-sequence-threshold can be based on a statistical measure of the crop-offset-values such as the mean value of the crop-offset-values. The discard-sequence-threshold can have an inverse dependence on the absolute value of the crop-offset-values. In other words, the discard-sequence-threshold decreases for an increasing amount of head movement. This can allow for changes in ambient lighting conditions of the user's eye. Setting the discard-sequence-threshold in this manner allows a threshold to be dynamically set depending on the movement of the user's head. The method can then include setting a discard-flag for the sequence of images if the sequence-score is greater than the discard-sequence-threshold.

In one or more examples, the method may also comprise adjusting pixel-value-thresholds based on the crop-offset-identifier. For example, comparing the pair of images in the sequence may comprise: comparing pixel-values at corresponding pixel-positions in the pair of images to determine pixel-value-differences; and setting a pixel-value-threshold based on the crop-offset-value. Determining the image score may then comprise either: the integer number of absolute pixel-value-differences that are greater than or equal to the pixel-value-threshold; or the sum of the absolute pixel-value-differences that exceed the pixel-value-threshold.

As mentioned previously, the method described herein may be performed by the apparatus 300. Accordingly, the apparatus 300 may be configured to carry out one or more of the method steps described herein.

The apparatus 300 may have only one processor 301 and one memory 302 but it will be appreciated that other embodiments may utilise more than one processor and/or more than one memory (e.g. same or different processor/memory types). Further, the apparatus 300 may be an Application Specific Integrated Circuit (ASIC). The processor 300 may be a general purpose processor dedicated to executing/processing information received from other components, in accordance with instructions stored in the form of computer program code in the memory 302. The output signalling generated by such operations of the processor is provided onwards to further components, such as to provide the downstream eye tracking operations.

The memory 302 (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor.

The invention claimed is:

1. A computer-implemented method of selecting a sequence of images of a user's eye for an eye tracking application wherein each image is captured when a stationary stimulus point is displayed to the user, the method comprising, for a plurality of different pairs of the images:

comparing the pair of images with each other to determine an image-score that represents a degree of difference between the compared images; and
calculating a sequence-score based on the image-scores for the plurality of pairs of images.

2. The method of claim 1, wherein:
each of the images in the sequence comprises a gaze-location-identifier that represents the location of the stimulus on a screen that was presented to the user when the image was captured; and
the gaze-location-identifier is the same for each image in the sequence of images.

3. The method of claim 1, further comprising controlling how the sequence of images is passed to a downstream eye gaze tracking operation based on the sequence-score.

4. The method of claim 1, further comprising:
setting a discard-flag for at least a portion of the sequence of images if the sequence-score is greater than a discard-threshold.

5. The method of claim 1, further comprising:
discarding at least a portion of the sequence of images if the sequence-score is greater than a discard-threshold.

6. The method of claim 4, further comprising:
setting an inspection-flag for at least a portion of the sequence of images if the sequence-score is greater than an inspection-threshold, wherein the inspection-threshold is less than the discard-threshold; and
if the inspection-flag is set, then providing the at least a portion of the sequence of images to a user for manually setting the discard-flag.

7. The method of claim 4, further comprising:
performing a downstream eye gaze tracking operation on sequences of images for which the discard-flag is not set, and not performing the eye gaze tracking operation on sequences of images for which the discard-flag is set.

8. The method of claim 4, further comprising:
performing a downstream eye gaze tracking operation on the sequence of images irrespective of whether or not the associated discard-flag is set; and
aggregating performance evaluation statistics on sequences of images for which the discard-flag is not set, and not aggregating performance evaluation statistics on sequences of images for which the discard-flag is set.

9. The method of claim 1, further comprising:
identifying a plurality of spaced apart sub-sequences of images in the sequence of images, wherein each sub-sequence comprises a plurality of consecutive images in the sequence of images that satisfy a sub-sequence-score-threshold; and
concatenating the plurality of sub-sequences of images to provide a concatenated-sequence of images; and
providing the concatenated-sequence of images to a downstream eye gaze tracking operation.

10. The method of claim 7, wherein the eye gaze tracking operation comprises:
a training algorithm for setting one or more trainable parameters of a machine learning model for performing eye gaze tracking on received images;
a calibration algorithm;
a verification algorithm; and/or
a performance evaluation algorithm.

11. The method of claim 10, wherein:
each sequence of images comprises a gaze-location-identifier that represents the location of a stimulus on a screen that was presented to the user when the sequence of images was captured; and
the eye gaze tracking operation performs its function based on the images and the gaze-location-identifier.

12. The method of claim 1, wherein calculating the sequence-score based on the image-scores comprises:
summing the image-scores to provide an accumulated-sequence-score.

13. The method of claim 1, wherein calculating the sequence-score based on the image-scores comprises:
setting a peak-sequence-score as the maximum value of the image-scores.

14. The method of claim 13, further comprising:
setting a blink-flag for the sequence of images if the peak-sequence-score is greater than a blink-threshold; and
if the blink-flag is set, then passing the sequence of images to a downstream eye gaze tracking operation that requires a presence of a blink in the sequence of images; or
if the blink-flag is not set, then passing the sequence of images to a downstream eye gaze tracking operation that requires the absence of a blink in the sequence of images.

15. The method of claim 13, further comprising:
setting a movement-flag for the sequence of images if the peak-sequence-score is greater than a movement-threshold; and
if the movement-flag is set, then passing the sequence of images to a downstream eye gaze tracking operation that requires a presence of a movement in the sequence of images; or
if the movement-flag is not set, then passing the sequence of images to a downstream eye gaze tracking operation that requires the absence of movement in the sequence of images.

16. The method of claim 1, wherein the method further comprises:
causing a screen to display a stationary stimulus point to the user in accordance with a gaze-location-identifier; and
capturing the sequence of images of the user's eye while the screen is displaying the stationary stimulus point to the user.

17. The method of claim 1, wherein:
each of the images comprises a plurality of pixel positions, and each pixel position has a pixel-value that represents a brightness or hue of the pixel; and
comparing the pair of images comprises:
comparing pixel-values at corresponding pixel-positions in the pair of images to determine pixel-value-differences; and
determining the image-score as a function of the pixel-value-differences.

18. The method of claim 1, wherein:
each of the images comprises:
a plurality of pixel positions that represent a subset of pixels from a full-sensor-image, and
a crop-identifier that represents a location of the subset of pixels in the full-sensor-image; and
comparing the pair of images comprises determining a crop-offset-value as the difference between the crop-identifiers of the two images;
the method further comprises:
setting a discard-sequence-threshold based on the crop-offset-values; and setting a discard-flag for the sequence of images if the sequence-score is greater than the discard-sequence-threshold.

19. A processor configured to:
receive a sequence of images of a user's eye for an eye tracking application;
for a plurality of different pairs of the images:
compare the pair of images with each other to determine an image-score that represents a degree of difference between the compared images; and
calculate a sequence-score based on the image-scores for the plurality of pairs of images.

20. A non-transitory computer-readable storage medium storing instructions which, when executed by a cause the computer to carry out the steps of:
selecting a sequence of images of a user's eye for an eye tracking application wherein each image is captured when a stationary stimulus point is displayed to the user,
comparing a plurality of different pairs of the images with each other to determine an image-score that represents a degree of difference between the compared images; and
calculating a sequence-score based on the image-scores for the plurality of pairs of images.

* * * * *